(12) United States Patent
Hikaru (10) Patent No.: US 9,398,212 B2
(45) Date of Patent: Jul. 19, 2016

(54) IMAGE PROCESSING METHOD AND IMAGE PROCESSING SYSTEM AND IMAGE CAPTURING DEVICE USING THE SAME

(75) Inventor: Masui Hikaru, Taipei (TW)

(73) Assignee: ABILITY ENTERPRISE CO., LTD., Taipei (TW)

( * ) Notice: Subject to any disclaimer, the term of this patent is extended or adjusted under 35 U.S.C. 154(b) by 987 days.

(21) Appl. No.: 13/286,187

(22) Filed: Oct. 31, 2011

(65) Prior Publication Data

US 2013/0107081 A1 May 2, 2013

(51) Int. Cl.
| | |
|---|---|
| H04N 5/232 | (2006.01) |
| G06T 3/40 | (2006.01) |
| H04N 5/217 | (2011.01) |
| H04N 1/409 | (2006.01) |
| H04N 101/00 | (2006.01) |

(52) U.S. Cl.
CPC .......... *H04N 5/23229* (2013.01); *G06T 3/4053* (2013.01); *H04N 1/4092* (2013.01); *H04N 5/217* (2013.01); *H04N 5/23235* (2013.01); *H04N 2101/00* (2013.01); *H04N 2201/3252* (2013.01); *H04N 2201/3253* (2013.01)

(58) Field of Classification Search
USPC .................................... 348/222.1, 231.6, 241
See application file for complete search history.

(56) References Cited

U.S. PATENT DOCUMENTS

| | | | | |
|---|---|---|---|---|
| 2003/0007076 A1* | 1/2003 | Okisu | ................ | H04N 5/23245 348/222.1 |
| 2003/0095197 A1* | 5/2003 | Wheeler | .................. | H04N 1/40 348/241 |
| 2003/0137597 A1* | 7/2003 | Sakamoto | ............ | H04N 5/2354 348/371 |
| 2003/0206231 A1* | 11/2003 | Chen | .................. | H04N 1/00137 348/207.99 |
| 2004/0119841 A1* | 6/2004 | Shimizu | ...................... | 348/222.1 |
| 2004/0179111 A1* | 9/2004 | Hattori | .................. | H04N 5/235 348/222.1 |
| 2005/0030564 A1* | 2/2005 | Su et al. | .......................... | 358/1.9 |
| 2005/0174449 A1* | 8/2005 | Matsuzaka | .............. | G06T 7/403 348/240.3 |
| 2005/0185058 A1 | 8/2005 | Sablak | | |
| 2007/0052819 A1* | 3/2007 | Nakao et al. | ............... | 348/231.1 |
| 2008/0088858 A1* | 4/2008 | Marcu | .................... | H04N 1/407 358/1.6 |
| 2009/0167895 A1* | 7/2009 | Hoshuyama et al. | ...... | 348/231.6 |
| 2009/0290042 A1* | 11/2009 | Shiohara | ............ | H04N 1/00132 348/222.1 |
| 2011/0102630 A1* | 5/2011 | Rukes | ......................... | 348/223.1 |
| 2011/0267492 A1* | 11/2011 | Prentice | ................... | G03B 7/08 348/223.1 |
| 2011/0292257 A1* | 12/2011 | Hatakeyama | ............ | H04N 1/58 348/242 |

FOREIGN PATENT DOCUMENTS

| | | |
|---|---|---|
| CN | 101340518 A | 1/2009 |
| CN | 102216941 A | 10/2011 |

OTHER PUBLICATIONS

Chinese Office Action dated Feb. 28, 2015.

* cited by examiner

*Primary Examiner* — Twyler Haskins
*Assistant Examiner* — Akshay Trehan
(74) *Attorney, Agent, or Firm* — Rabin & Berdo, P.C.

(57) ABSTRACT

An image processing method applied to an image capturing device includes the following steps. Firstly, a number of shooting parameters, provided by an image capturing module of the image capturing device, are obtained. Next, a number of super resolution parameters are obtained according to the shooting parameters. Then, a captured image is obtained through the image capturing module. After that, a super resolution operation is executed on the captured image based on the super resolution parameters.

20 Claims, 6 Drawing Sheets

| Exif Information | Application | Sharpness Freq. Peak | Noise Reduction | Waveform Restore |
|---|---|---|---|---|
| Exposure time | Short | High | Shallow | Less |
| | Long | Low | Deep for High Freq | Strong |
| F number | Small | Low | Shallow | Less |
| | Large | High | Deep for High Freq | Strong |
| ISO speed rating | Low ISO | High | Shallow | Less |
| | High ISO | Low | Deep | Strong |
| Shutter speed | Slow Shutter Speed | Low | Shallow | Strong |
| | High Shutter Speed | High | Deep | Less |
| Aperture | Same as F number | | | |
| Focal length /Focus Distance | Long/Near | Low | No SR for Background | Less |
| | Long/Far | Low | - | --- |
| | Short/Near | High | - | Less |
| | Short/Far | High | - | --- |
| D-zoom ratio | Higher D-zoom | Low | Deep | Strong |
| | No D-zoom | High | Less | Less |
| GPS | City area (by data base) | High | Deep | Strong |
| | Country side (by data base) | Low | Less | Less |
| Macro | Macro | Low | No SR for Background | |
| | Non-Macro | High | --- | |

FIG. 1

| EXIF |
| --- |
| . . . . . . . |
| Exposure time |
| F number |
| ISO speed rating |
| Shutter speed |
| Aperture |
| Focal length |
| D-zoom ratio |
| . . . . . . . |
| Sharpness |
| Gamma |
| GPS Tag |
| Temperature |
| Brightness |
| Contrast |
| Focus distance |
| Macro |
| . . . . . . . |

| Exif information | Application | Sharpness Freq. Peak | Noise Reduction | Waveform Restore |
|---|---|---|---|---|
| Exposure time | Short<br>Long | High<br>Low | Shallow<br>Deep for High Freq | Less<br>Strong |
| F number | Small<br>Large | Low<br>High | Shallow<br>Deep for High Freq | Less<br>Strong |
| ISO speed rating | Low ISO<br>High ISO | High<br>Low | Shallow<br>Deep | Less<br>Strong |
| Shutter speed | Slow Shutter Speed<br>High Shutter Speed | Low<br>High | Shallow<br>Deep | Strong<br>Less |
| Aperture | Same as F number | | | |
| Focal length /Focus Distance | Long/Near<br>Long/Far<br>Short/Near<br>Short/Far | Low<br>Low<br>High<br>High | No SR for Background<br>--<br>--<br>-- | Less<br>---<br>Less<br>--- |
| D-zoom ratio | Higher D-zoom<br>No D-zoom | Low<br>High | Deep<br>Less | Strong<br>Less |
| GPS | City area (by data base)<br>Country side (by data base) | High<br>Low | Deep<br>Less | Strong<br>Less |
| Macro | Macro<br>Non-Macro | Low<br>High | No SR for Background<br>--- | |

IMAGE PROCESSING METHOD AND IMAGE PROCESSING SYSTEM AND IMAGE CAPTURING DEVICE USING THE SAME

This application incorporates by reference Taiwan application Serial No. 100138968, filed Oct. 26, 2011.

BACKGROUND OF THE INVENTION

1. Field of the Invention

The invention relates in general to an image processing method and an image processing system and an image capturing device using the same, and more particularly to an image processing method capable of adjusting a super resolution operation in response to shooting parameter changes, and an image processing system and an image capturing device using the same.

2. Description of the Related Art

Consumer digital image capturing devices, such as a digital camera, a digital single lens reflex camera (DSLR), a digital video recorder and other handheld devices with a shooting unit, have been widely accepted in the market. Generally speaking, an exchangeable image file format (EXIF) has been widely applied to the data formats of the digital camera, a smart mobile phone, a scanner and other handheld video-audio technological devices to correspondingly indicate the shooting condition information.

However, the existing art does not provide any technique for enhancing the image processing performance of various image capturing devices with reference to the EXIF information. Therefore, it is an important direction in the industry to design an image processing method of enhancing the image processing performance of the image capturing device with reference to the EXIF information.

SUMMARY OF THE INVENTION

The invention is directed to an image processing method applied to an image processing system and an image capturing device.

Firstly, the image processing method associated with the invention obtains shooting parameters from an image capturing module of the image capturing device, and correspondingly obtains super resolution parameters. Next, the image processing method associated with the invention further correspondingly executes a super resolution process on the captured image according to the super resolution parameters. Thus, compared with the conventional image processing method, the image processing method associated with the invention and the image processing system and the image capturing device using the same have the advantage of effectively adjusting the super resolution image processing operation with reference to the shooting parameters.

According to a first aspect of the present invention, an image capturing device including an image capturing module and an image processing system is provided. The image capturing module captures an captured image. The image processing system includes a parameter unit, a control unit and a super resolution unit. The parameter unit is coupled to the image capturing module and obtains a number of shooting parameters provided by the image capturing module. The control unit receives the shooting parameters and obtains a number of super resolution parameters. The super resolution unit receives the captured image and performs a super resolution operation on the captured image according to the super resolution parameters provided by the control unit.

According to a second aspect of the present invention, an image processing method applied to an electronic device capable of capturing an image is provided. The method includes the following steps. First, a plurality of shooting parameters provided by an image capturing module is defined. Next, at least one super resolution parameter is defined according to the shooting parameters. Then, a captured image is obtained using the image capturing module. After that, a super resolution operation is executed on the captured image according to the super resolution parameters.

According to a third aspect of the present invention, an image processing system applied to an electronic device is provided. The electronic device includes a digital sensor. The image processing system includes a parameter unit, a control unit and a super resolution unit. The parameter unit is coupled to an image capturing module and obtains at least one shooting parameter. The control unit receives the shooting parameters and determines a number of super resolution parameters. The super resolution unit performs an operation on an image according to the super resolution parameters.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 4 is a schematic illustration showing an EXIF database subunit 220a.

DETAILED DESCRIPTION OF THE INVENTION

Figure 1:
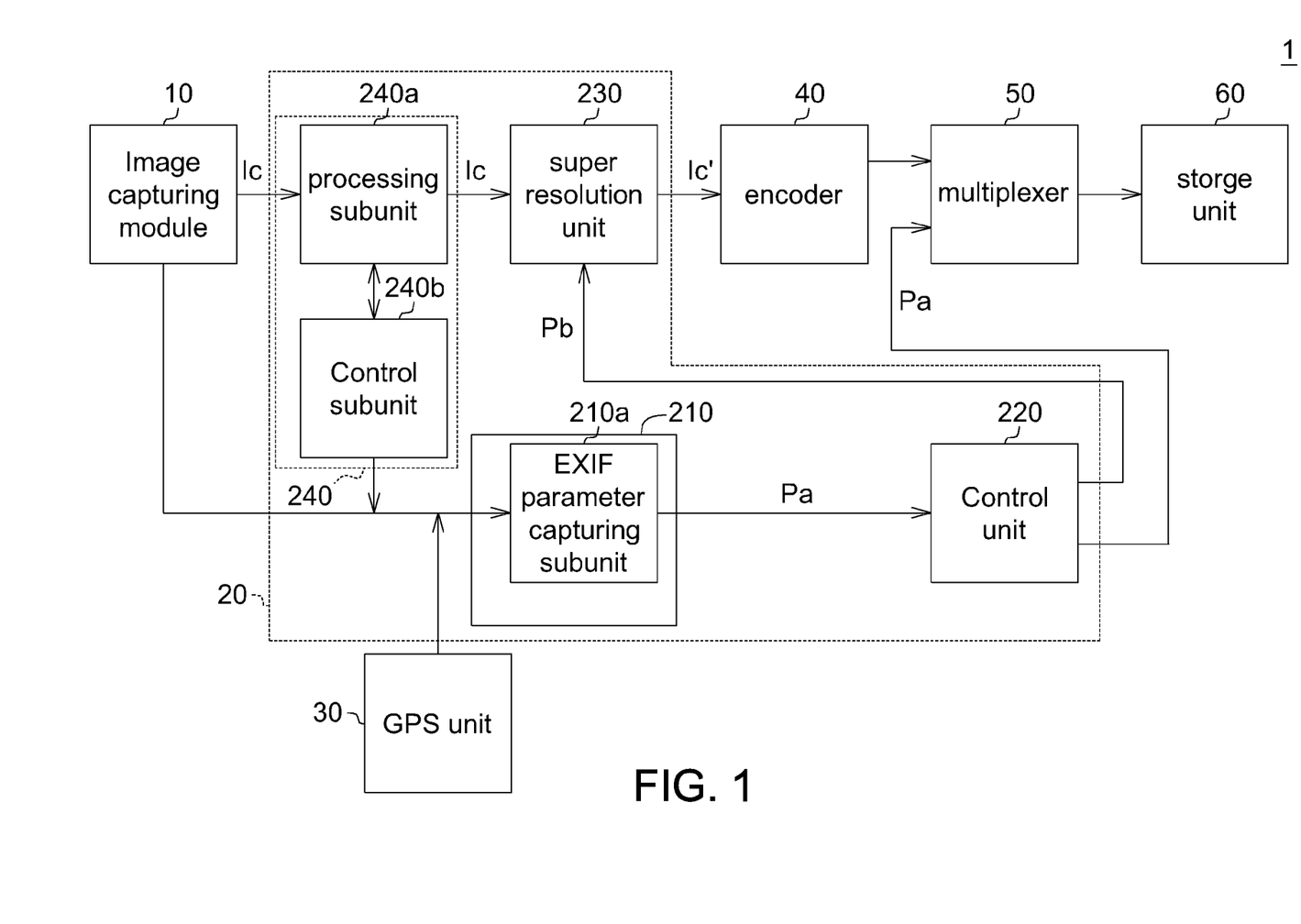
FIG. 1 is a block diagram showing an image capturing device according to an embodiment of the invention.

FIG. 1 is a block diagram showing an image capturing device 1 according to an embodiment of the invention. Referring to FIG. 1, the image capturing device 1 includes an image capturing module 10 and an image processing system 20. For example, the image capturing device 1 is a digital camera, and the image capturing module 10 includes a lens unit, a shutter unit and a digital image sensor. Therefore, the image capturing device 1 can correspondingly capture a captured image Ic.

The image processing system 20 receives the captured image Ic and performs image processing on the captured image Ic. The image processing system 20 includes a parameter unit 210, a control unit 220 and a super resolution unit 230. The parameter unit 210 is coupled to the image capturing module 10 and obtains a number of shooting parameters provided by the image capturing module 10. For example, the parameter unit 210 includes an exchangeable image file format (EXIF) parameter capturing subunit 210a, and the shooting parameter obtained by the parameter unit 210 is an EXIF parameter Pa. In other words, the parameter unit 210 uses the EXIF parameter Pa as the shooting parameter.

Figure 2:
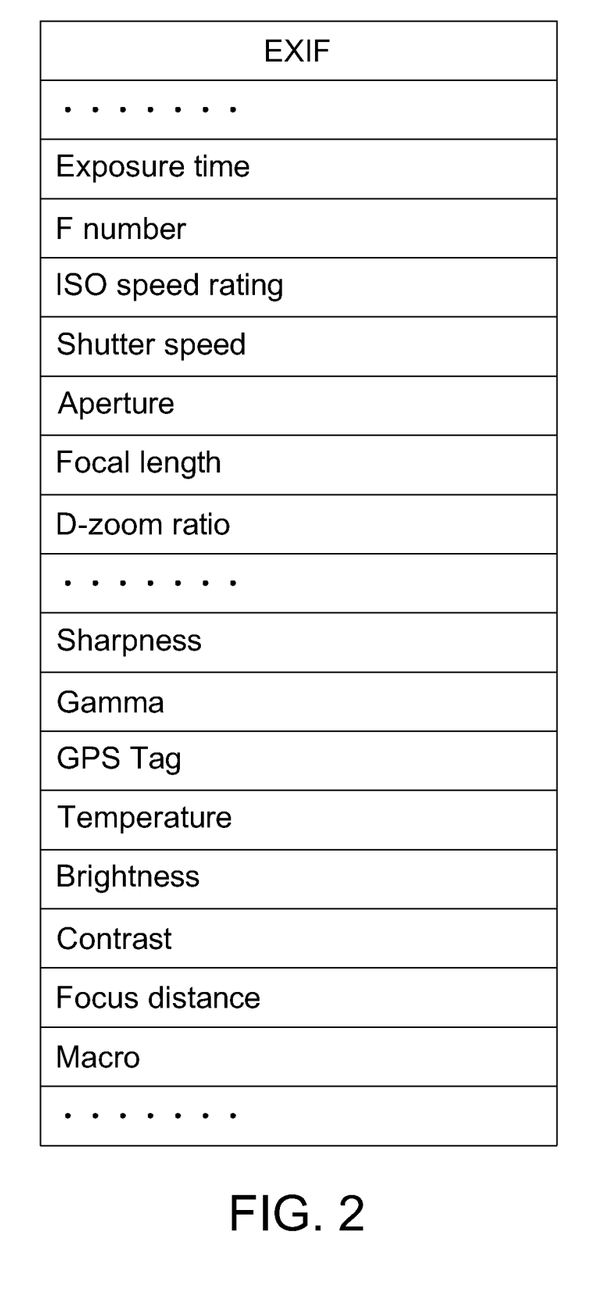
FIG. 2 is a schematic illustration showing EXIF parameters Pa.

FIG. 2 is a schematic illustration showing the EXIF parameters Pa. For example, the EXIF parameter Pa includes the exposure time, the F number (aperture value), the sensitivity setting value (ISO value), the shutter speed, the focal length, the digital zoom ratio, the focus distance and the like corresponding to the captured image Ic. The image capturing device 1 further includes a global positioning system (GPS) unit 30, which is coupled to the EXIF parameter capturing subunit 210a and provides global positioning system parameters, such that the global positioning system parameters are also included in the EXIF parameters Pa.

The control unit 220 receives the EXIF parameter Pa and obtains a number of super resolution parameters Pb. The super resolution unit 230 receives the captured image Ic and executes a super resolution operation on the captured image Ic according to a super resolution parameter Pb provided by the control unit 220 to correspondingly obtain the processed captured image Ic'. Therefore, the image capturing device 1 can effectively execute the super resolution operation with reference to the shooting parameters. Next, an operation example will be illustrated to further describe the operation of each unit in the image capturing device 1.

Figure 3:
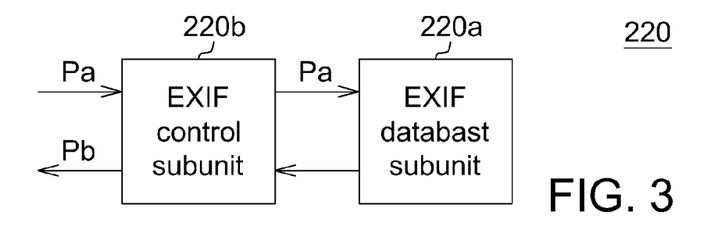
FIG. 3 is a detailed block diagram showing a control unit 220.

FIG. 3 is a detailed block diagram showing the control unit 220. Referring to FIG. 3, for example, the control unit 220 includes an EXIF database subunit 220a and an EXIF control subunit 220b. The EXIF database subunit 220a includes a number of data fields respectively corresponding to the EXIF parameters Pa, wherein each data field stores at least one super resolution image processing program. The EXIF control subunit 220b receives the EXIF parameter Pa provided by the EXIF parameter capturing subunit 210a, and accordingly queries the EXIF database subunit 220a to obtain the super-resolution-image-selection processing program and a number of super-resolution-selection parameters Pb corresponding thereto.

Figure 4:
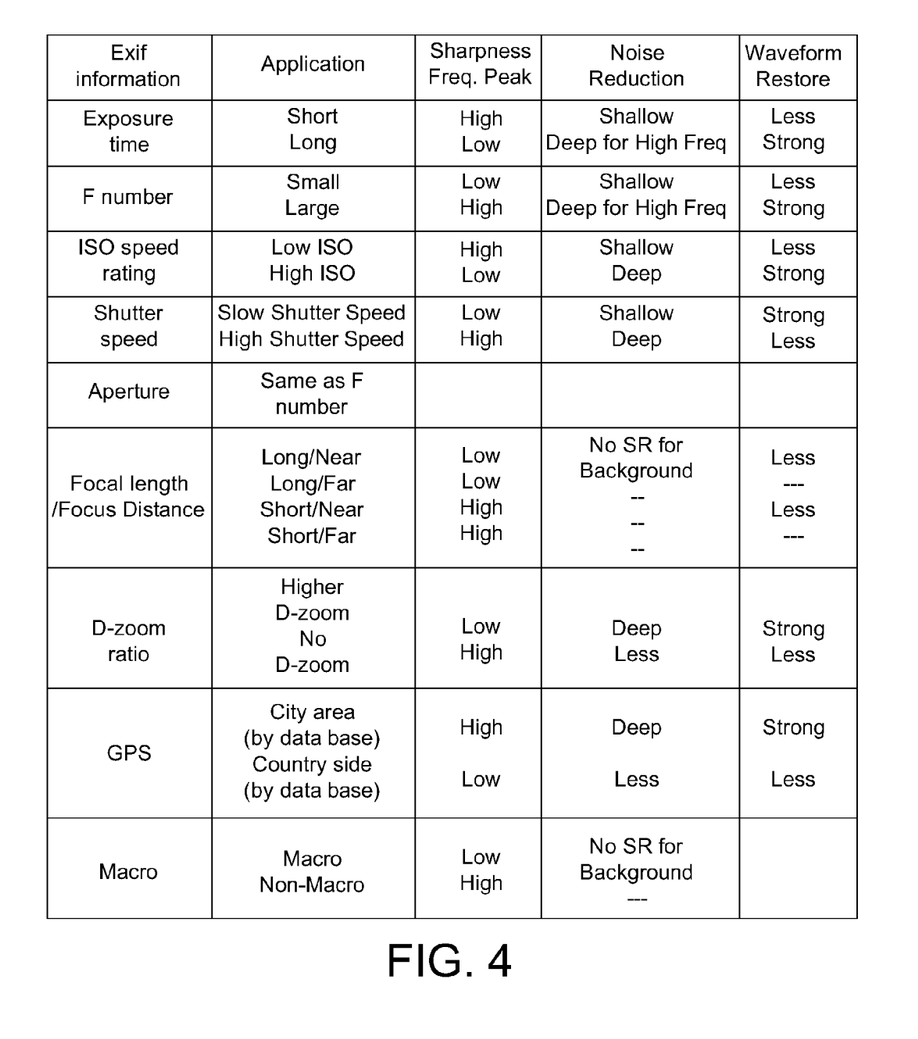

FIG. 4 is a schematic illustration showing the EXIF database subunit 220a. For example, the EXIF parameter "exposure time" corresponds to a short exposure time image processing program and a long exposure time image processing program. When the EXIF parameter Pa indicates a dark background condition (e.g., the corresponding condition when the exposure time is greater than 1/60 seconds), the correspondingly obtained long exposure time image processing program corresponds to the super resolution operation with the reduced sharpness frequency peak, the increased high frequency noise reduction and the increased waveform restore.

Correspondingly, when the EXIF parameter Pa indicates a bright background condition (e.g., the corresponding condition when the exposure time is smaller than 1/60 seconds), the correspondingly obtained short exposure time image processing program corresponds to the super resolution operation with the increased sharpness frequency peak, the reduced high frequency noise reduction and the reduced waveform restore. Accordingly, the control unit 220 can selectively execute the long exposure time or short exposure time image processing program with reference to the "exposure time" in the EXIF parameters, and provide the corresponding super resolution parameter Pb.

Similarly, each of the EXIF parameters, including the "F number", the "ISO value", the "shutter speed" and the "aperture value", may also selectively correspond to the small/large aperture image processing program, the low/high ISO image processing program, and the slow/fast shutter image processing program. Accordingly, the control unit 220 can obtain the corresponding super resolution parameter Pb with reference to each of the EXIF parameters.

In another example, the EXIF parameter "focal length/focus distance" corresponds to one of the long focal length/short focus distance image processing program, the long focal length/far focus distance image processing program, the short focal length/short focus distance image processing program and the short focal length/far focus distance image processing program. For example, the threshold value of the focal length is equal to 50 millimeters, and the threshold value of the focus distance is equal to 100 centimeters. When the EXIF parameter Pa indicates the focal length longer than 50 mm and the focus distance nearer than 100 cm, the correspondingly obtained long focal length/short focus distance image processing program corresponds to the super resolution operation with the background-portion-ignore processing operation of the captured image, the reduced sharpness frequency peak and the reduced waveform restore.

When the EXIF parameter Pa indicates the focal length longer than 50 mm and the focus distance farther than 100 cm, the correspondingly obtained long focal length/far focus distance image processing program corresponds to the super resolution operation with the reduced sharpness frequency peak. When the EXIF parameter Pa indicates the focal length shorter than 50 mm and the focus distance nearer than 100 cm, the correspondingly obtained short focal length/short focus distance image processing program corresponds to super resolution operation with the increased sharpness frequency peak and the reduced waveform restore. When the EXIF parameter Pa indicates the focal length shorter than 50 mm and the focus distance farther than 100 cm, the correspondingly obtained short focal length/far focus distance image processing program corresponds to the super resolution operation with the increased sharpness frequency peak and the reduced waveform restore.

In still another example, the EXIF parameter "digital zoom ratio" corresponds to a high digital zoom image processing program and a low digital zoom image processing program. When the EXIF parameter Pa indicates that the captured image Ic corresponds to the high digital zoom setting, the correspondingly obtained super resolution image processing program corresponds to the super resolution operation with the reduced sharpness frequency peak, the increased high frequency noise reduction and the increased waveform restore. When the EXIF parameter Pa indicates that the captured image Ic corresponds to the low digital zoom setting, the correspondingly obtained super resolution image processing program corresponds to the super resolution operation with the increased sharpness frequency peak, the reduced high frequency noise reduction and the reduced waveform restore.

In yet still another example, the EXIF parameter "global positioning system" corresponds to an artificial environment super resolution image processing program and a natural environment super resolution image processing program. When the EXIF parameter Pa indicates that the image capturing device 1 is in an artificial scene (e.g., in the metropolis environment), the correspondingly obtained super resolution image processing program corresponds to the super resolution operation with the increased sharpness frequency peak, the increased high frequency noise reduction and the increased waveform restore. Correspondingly, when the EXIF parameter Pa indicates that the image capturing device 1 is in a natural scene (e.g., a natural environment), the correspondingly obtained super resolution image processing program corresponds to the super resolution operation with the reduced sharpness frequency peak, the reduced high frequency noise reduction and the reduced waveform restore.

In yet still another example, the EXIF parameter "macro" corresponds to a macro super resolution image processing program and a non-macro super resolution image processing program. When the EXIF parameter Pa indicates that the image capturing device 1 operates in a macro shooting mode, the correspondingly obtained super resolution image processing program corresponds to the super resolution operation with the increased sharpness frequency peak, the increased high frequency noise reduction and the increased waveform restore. Correspondingly, when the EXIF parameter Pa indicates that the image capturing device 1 is in the natural scene (e.g., the natural environment), the correspondingly obtained super resolution image processing program corresponds to the super resolution operation with the background-portion-ignore processing operation of the captured image and the reduced sharpness frequency peak. Correspondingly, when the EXIF parameter Pa indicates that the image capturing device 1 operates in the non-macro shooting mode, the correspondingly obtained super resolution image processing program corresponds to the super resolution operation with the increased sharpness frequency peak.

To sum up, the control unit 220 can obtain the corresponding super resolution image processing program and its corresponding super resolution parameter Pb with reference to each of the EXIF parameters Pa.

Figure 5:
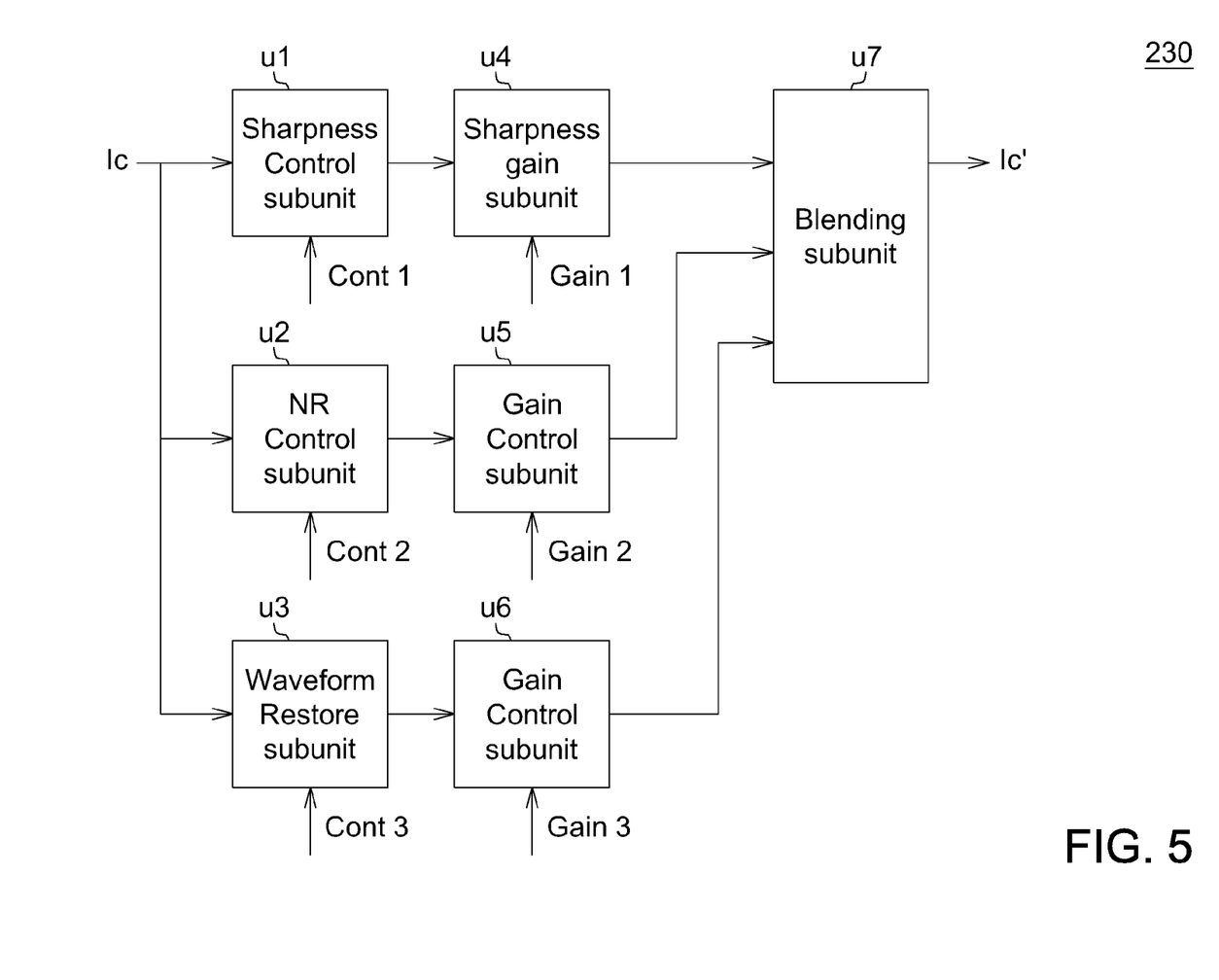
FIG. 5 is a detailed block diagram showing a super resolution unit 230.

FIG. 5 is a detailed block diagram showing the super resolution unit 230. Referring to FIG. 5, for example, the super resolution parameter Pb includes a sharpness control parameter Cont1 and a gain parameter Gain1, a high frequency noise reduction control parameter Cont2 and a gain parameter Gain2, and a waveform restore control parameter Cont3 and a gain parameter Gain3. In such an example, the super resolution unit 230 includes a sharpness control subunit u1, a noise reduction control subunit u2 and a waveform restore control subunit u3, respectively controlled by the sharpness, noise reduction and waveform restore control parameters Cont1 to Cont3. The super resolution unit 230 further includes a sharpness gain subunit u4, a noise reduction gain subunit u5 and a waveform restore gain subunit u6, respectively controlled by the sharpness, noise reduction and waveform restore gain parameters Gain1 to Gain3. The super resolution unit 230 further includes, for example, a blending subunit u7 coupled to the gain control subunits u4 to u6. The blending subunit u7 receives and correspondingly mixes the output signals of the gain control subunits u4 to u6 to obtain the processed captured image Ic'.

Figure 6A:
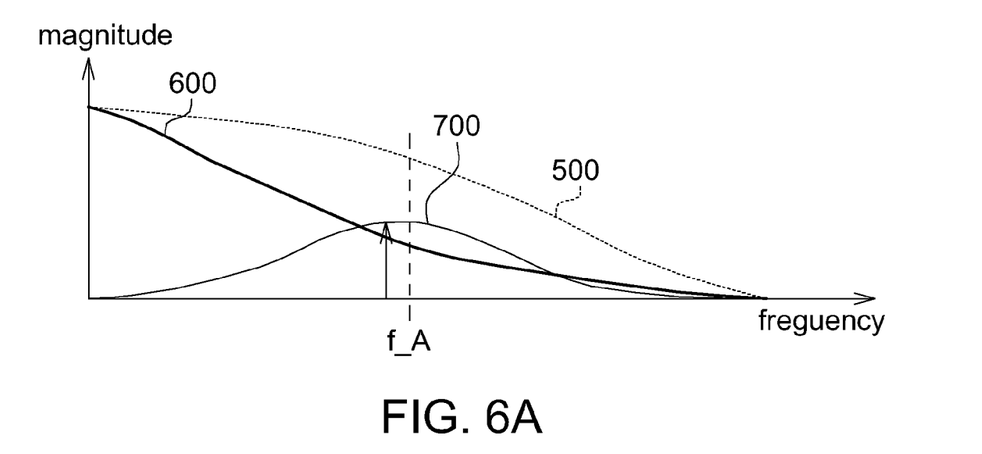
FIGS. 6A and 6B are schematic illustration showing frequency responses of associated signals of the super resolution unit 230.
Figure 6B:
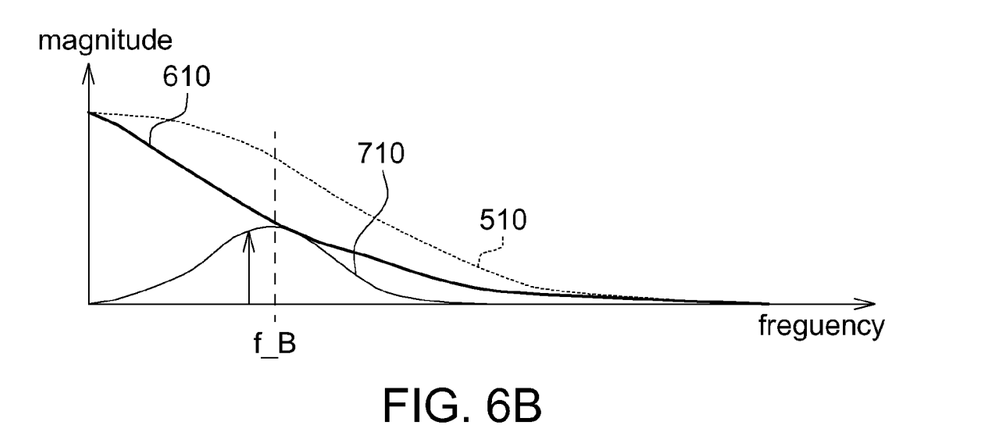

FIGS. 6A and 6B are schematic illustration showing frequency responses of associated signals of the super resolution unit 230. For example, FIGS. 6A and 6B show the frequency responses of the sharpness control unit (including the sharpness control subunit u1 and the sharpness gain subunit u4). In detail, the curves 500, 600 and 700 respectively illustrate the gain curves of the captured image Ic (input signal), the processed captured image Ic' (output signal) and the sharpness control unit. Similarly, the curves 510, 610 and 710 respectively illustrate the gain curves of the captured image Ic (input signal), the processed captured image Ic' (output signal) and the sharpness control unit. For example, the gain curves 700 and 710 are determined according to the sharpness gain parameter Gain1 having different values and different sharpness frequency peaks f_A and f_B.

In one example, the image processing system 20 further includes an image processing unit 240 for executing the active gamma curve control (ALC) and auto white balance (AWB) processing operations. For example, the image processing system 20 includes a processing subunit 240a and a control subunit 240b, which provides the ACL and AWB processing information to the parameter unit 210. Therefore, the information (including the color temperature, the gamma conversion curve and the like) may also be included in the EXIF parameter Pa.

In one example, the image capturing device 1 further includes an encoder 40, a multiplexer 50 and a storage unit 60, which execute an image storage format (e.g., JPEG format) encoding process, integrate the EXIF parameter Pa into the JPEG file and store the processed image file into a storage medium (e.g., a memory card), respectively.

Figure 7:
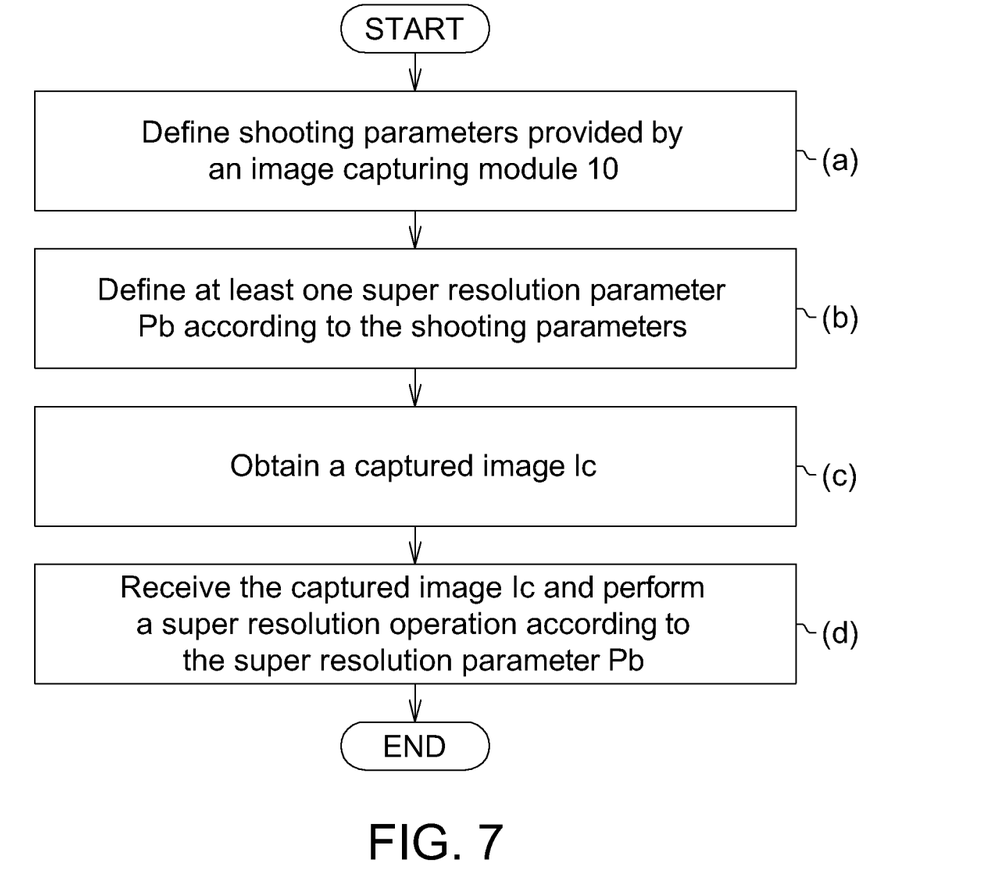
FIG. 7 is a flow chart showing an image processing method according to an embodiment of the invention.

FIG. 7 is a flow chart showing an image processing method according to an embodiment of the invention. Referring to FIG. 7, the image processing method of this embodiment includes the following steps. Firstly, in step (a), the parameter unit 210 defines the shooting parameters, which include the EXIF parameter Pa, for example, and is provided by the image capturing module 10. Next, in step (b), the control unit 220 defines at least one super resolution parameter Pb according to the shooting parameter. Then, in step (c), the image capturing module 10 obtains the captured image Ic. After that, in step (d), the super resolution unit 230 receives the captured image Ic and performs the super resolution operation on the captured image Ic according to the super resolution parameter Pb.

Firstly, the image processing method of this embodiment obtains the shooting parameters from the image capturing module of the image capturing device, and correspondingly obtains the super resolution parameters. Next, the image processing method of this embodiment further correspondingly executes the super resolution process on the captured image according to the super resolution parameters. Thus, compared with the conventional image processing method, the image processing method of this embodiment and the image processing system and the image capturing device using the same have the advantage of effectively adjusting the super resolution image processing operation with reference to the shooting parameters.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capturing device, comprising:
 an image capturing module capturing a captured image and providing one or more than one exchangeable image file format (EXIF) parameter of the captured image; and
 an image processing system, comprising:
 a parameter unit, coupled to the image capturing module, obtaining the EXIF parameter provided by the image capturing module;
 a control unit receiving the EXIF parameter and obtaining a number of super resolution parameters; and
 a super resolution unit receiving the captured image and performing a super resolution operation on the captured image according to the super resolution parameters provided by the control unit;
 wherein when the EXIF parameter indicates a long focal length and short focus distance condition, a super-resolution-image-selection processing program accessible to the control unit corresponds to the super resolution operation with a background-portion-ignore processing operation of the captured image, a reduced sharpness frequency peak and a reduced waveform restore; and wherein when the EXIF parameter indicates a short focal length and short focus distance condition, the super-resolution-image-selection processing program corresponds to the super resolution operation with an increased sharpness frequency peak and a reduced waveform restore.

2. The image capturing device according to claim 1, wherein the parameter unit comprises an EXIF parameter capturing subunit to obtain the EXIF parameter of the captured image, and the control unit comprises:
an EXIF database subunit comprising a plurality of data fields respectively corresponding to the EXIF parameter, wherein each of the data fields stores at least one super resolution image processing program; and/or
an EXIF control subunit for receiving the EXIF parameter provided by the EXIF parameter capturing subunit and correspondingly querying the EXIF database subunit to obtain the super-resolution-image-selection processing program and a plurality of super-resolution selecting parameters corresponding to the super-resolution-image-selection processing program.

3. The image capturing device according to claim 2, wherein:
when the EXIF parameter indicates a dark background condition, the super-resolution-image-selection processing program corresponds to the super resolution operation, which has a reduced sharpness frequency peak, an increased high frequency noise reduction and an increased waveform restore; and/or
when the EXIF parameter indicates a bright background condition, the super-resolution-image-selection processing program corresponds to the super resolution operation with an increased sharpness frequency peak, a reduced high frequency noise reduction and a reduced waveform restore.

4. The image capturing device according to claim 3, wherein the dark background condition is determined according to an exposure time, an aperture value and a shutter speed of the captured image and a sensitivity value of a digital sensor of the image capturing device.

5. The image capturing device according to claim 2, wherein when the EXIF parameter indicates a long focal length and far focus distance condition, the super-resolution-image-selection processing program corresponds to the super resolution operation with a reduced sharpness frequency peak.

6. The image capturing device according to claim 2, wherein when the EXIF parameter indicates a short focal length and far focus distance condition, the super-resolution-image-selection processing program corresponds to the super resolution operation with an increased sharpness frequency peak.

7. The image capturing device according to claim 2, wherein:
when the EXIF parameter indicates that the captured image corresponds to a high digital zoom setting, the super-resolution-image-selection processing program corresponds to the super resolution operation with a reduced sharpness frequency peak, an increased high frequency noise reduction and an increased waveform restore; and/or
when the EXIF parameter indicates that the captured image corresponds to a low digital zoom setting, the super-resolution-image-selection processing program corresponds to the super resolution operation with an increased sharpness frequency peak, an reduced high frequency noise reduction and a reduced waveform restore.

8. The image capturing device according to claim 1, wherein the parameter unit comprises a global positioning system parameter capturing subunit for obtaining a plurality of global positioning system parameters, which indicates a position of the image capturing device, and thus obtaining the EXIF parameter, wherein the control unit comprises:
a global positioning system database subunit comprising a plurality of data fields respectively corresponding to the global positioning system parameters indicating a plurality of shooting position information, wherein each of the data fields stores at least one super resolution image processing program; and/or
a global positioning system control subunit for receiving the global positioning system parameters provided by the global positioning system parameter capturing subunit, and correspondingly querying the global positioning system database subunit to obtain the super-resolution-image-selection processing program and a plurality of super-resolution selecting parameters corresponding to the super-resolution-image-selection processing program.

9. The image capturing device according to claim 8, wherein when the global positioning system parameter indicates that the image capturing device is in a city environment, the super-resolution-image-selection processing program corresponds to the super resolution operation with an increased sharpness frequency peak, an increased high frequency noise reduction and an increased waveform restore.

10. The image capturing device according to claim 8, wherein when the global positioning system parameter indicates that the image capturing device is in a natural landscape environment, the super-resolution-image-selection processing program corresponds to the super resolution operation with a reduced sharpness frequency peak, a reduced high frequency noise reduction and a reduced waveform restore.

11. An image processing system applied to an electronic device, comprising:
a parameter unit, coupled to an image capturing module, obtaining one or more than one exchangeable image file format (EXIF) parameter;
a control unit receiving the EXIF parameter and determining a number of super resolution parameters; and
a super resolution unit performing an operation on an image according to the super resolution parameters;
wherein when the EXIF parameter indicates a dark background condition, a super-resolution-image-selection processing program accessible to the control unit corresponds to the super resolution operation, which has a reduced sharpness frequency peak, an increased high frequency noise reduction and an increased waveform restore; and
wherein when the EXIF parameter indicates a bright background condition, the super-resolution-image-selection processing program corresponds to the super resolution operation with an increased sharpness frequency peak, a reduced high frequency noise reduction and a reduced waveform restore; and
wherein when the EXIF parameter indicates a long focal length and short focus distance condition, the super-resolution-image-selection processing program corresponds to the super resolution operation with a background-portion-ignore processing operation of the captured image, a reduced sharpness frequency peak and a reduced waveform restore; and wherein when the EXIF parameter indicates a short focal length and short focus distance condition, the super-resolution-image-selection processing program corresponds to the super resolution operation with an increased sharpness frequency peak and a reduced waveform restore; and wherein when the EXIF parameter indicates that the captured image corresponds to a high digital zoom setting, the super-resolution-image-selection processing program corresponds to the super resolution operation with a reduced sharpness frequency peak, an increased high frequency noise reduction and an increased waveform restore; and wherein when the EXIF parameter indicates that the captured image corresponds to a low digital zoom setting, the super-resolution-image-selection processing program corresponds to the super resolution operation with an increased sharpness frequency peak, an reduced high frequency noise reduction and a reduced waveform restore.

12. The image processing system according to claim 11, wherein the parameter unit comprises a global positioning system parameter capturing subunit for obtaining a plurality of global positioning system parameters, which indicates a position of the image capturing device, and thus obtaining the EXIF parameter, wherein the control unit comprises:
   a global positioning system database subunit comprising a plurality of data fields respectively corresponding to the global positioning system parameters indicating a plurality of shooting position information, wherein each of the data fields stores at least one super resolution image processing program; and/or
   a global positioning system control subunit for receiving the global positioning system parameters provided by the global positioning system parameter capturing subunit, and correspondingly querying the global positioning system database subunit to obtain the super-resolution-image-selection processing program and a plurality of super-resolution selecting parameters corresponding to the super-resolution-image-selection processing program.

13. The image processing system according to claim 11, wherein the parameter unit comprises an EXIF parameter capturing subunit to obtain the EXIF parameter of the captured image, and the control unit comprises:
   an EXIF database subunit comprising a plurality of data fields respectively corresponding to the EXIF parameter, wherein each of the data fields stores at least one super resolution image processing program; and/or
   an EXIF control subunit for receiving the EXIF parameter provided by the EXIF parameter capturing subunit and correspondingly querying the EXIF database subunit to obtain the super-resolution-image-selection processing program and a plurality of super-resolution selecting parameters corresponding to the super-resolution-image-selection processing program.

14. An image capturing device, comprising:
   an image capturing module capturing a captured image and providing one or more than one exchangeable image file format (EXIF) parameter of the captured image; and
   an image processing system, comprising:
   a parameter unit, coupled to the image capturing module, obtaining the EXIF parameter provided by the image capturing module;
   a control unit receiving the EXIF parameter and obtaining a number of super resolution parameters; and
   a super resolution unit receiving the captured image and performing a super resolution operation on the captured image according to the super resolution parameters provided by the control unit;

wherein when the EXIF parameter indicates a dark background condition, a super-resolution-image-selection processing program accessible to the control unit corresponds to the super resolution operation, which has a reduced sharpness frequency peak, an increased high frequency noise reduction and an increased waveform restore; and wherein when the EXIF parameter indicates a bright background condition, the super-resolution-image-selection processing program corresponds to the super resolution operation with an increased sharpness frequency peak, a reduced high frequency noise reduction and a reduced waveform restore.

15. The image capturing device according to claim 14, wherein the parameter unit comprises an EXIF parameter capturing subunit to obtain the EXIF parameter of the captured image, and the control unit comprises:
   an EXIF database subunit comprising a plurality of data fields respectively corresponding to the EXIF parameter, wherein each of the data fields stores at least one super resolution image processing program; and/or
   an EXIF control subunit for receiving the EXIF parameter provided by the EXIF parameter capturing subunit and correspondingly querying the EXIF database subunit to obtain the super-resolution-image-selection processing program and a plurality of super-resolution selecting parameters corresponding to the super-resolution-image-selection processing program.

16. The image capturing device according to claim 14, wherein the dark background condition is determined according to an exposure time, an aperture value and a shutter speed of the captured image and a sensitivity value of a digital sensor of the image capturing device.

17. The image capturing device according to claim 14, wherein the parameter unit comprises a global positioning system parameter capturing subunit for obtaining a plurality of global positioning system parameters, which indicates a position of the image capturing device, and thus obtaining the EXIF parameter, wherein the control unit comprises:
   a global positioning system database subunit comprising a plurality of data fields respectively corresponding to the global positioning system parameters indicating a plurality of shooting position information, wherein each of the data fields stores at least one super resolution image processing program; and/or
   a global positioning system control subunit for receiving the global positioning system parameters provided by the global positioning system parameter capturing subunit, and correspondingly querying the global positioning system database subunit to obtain the super-resolution-image-selection processing program and a plurality of super-resolution selecting parameters corresponding to the super-resolution-image-selection processing program.

18. An image capturing device, comprising:
   an image capturing module capturing a captured image and providing one or more than one exchangeable image file format (EXIF) parameter of the captured image; and
   an image processing system, comprising:
   a parameter unit, coupled to the image capturing module, obtaining the EXIF parameter provided by the image capturing module;

a control unit receiving the EXIF parameter and obtaining a number of super resolution parameters; and a super resolution unit receiving the captured image and performing a super resolution operation on the captured image according to the super resolution parameters provided by the control unit;

wherein when the EXIF parameter indicates that the captured image corresponds to a high digital zoom setting, a super-resolution-image-selection processing program accessible to the control unit corresponds to the super resolution operation with a reduced sharpness frequency peak, an increased high frequency noise reduction and an increased waveform restore; and wherein when the EXIF parameter indicates that the captured image corresponds to a low digital zoom setting, the super-resolution-image-selection processing program corresponds to the super resolution operation with an increased sharpness frequency peak, an reduced high frequency noise reduction and a reduced waveform restore.

19. The image capturing device according to claim 18, wherein the parameter unit comprises an EXIF parameter capturing subunit to obtain the EXIF parameter of the captured image, and the control unit comprises:

an EXIF database subunit comprising a plurality of data fields respectively corresponding to the EXIF parameter, wherein each of the data fields stores at least one super resolution image processing program; and/or an EXIF control subunit for receiving the EXIF parameter provided by the EXIF parameter capturing subunit and correspondingly querying the EXIF database subunit to obtain the super-resolution-image-selection processing program and a plurality of super-resolution selecting parameters corresponding to the super-resolution-image-selection processing program.

20. The image capturing device according to claim 18, wherein the parameter unit comprises a global positioning system parameter capturing subunit for obtaining a plurality of global positioning system parameters, which indicates a position of the image capturing device, and thus obtaining the EXIF parameter, wherein the control unit comprises:

a global positioning system database subunit comprising a plurality of data fields respectively corresponding to the global positioning system parameters indicating a plurality of shooting position information, wherein each of the data fields stores at least one super resolution image processing program; and/or a global positioning system control subunit for receiving the global positioning system parameters provided by the global positioning system parameter capturing subunit, and correspondingly querying the global positioning system database subunit to obtain the super-resolution-image-selection processing program and a plurality of super-resolution selecting parameters corresponding to the super-resolution-image-selection processing program.

* * * * *